United States Patent
Welker et al.

(10) Patent No.: US 7,856,997 B2
(45) Date of Patent: Dec. 28, 2010

(54) REMOVABLE AUTOMATIC INSERTION DEVICE WITH SEGMENTED DRAINAGE SHAFT

(75) Inventors: Brian H. Welker, Fulshear, TX (US); Tracy Dean Peebles, Houston, TX (US)

(73) Assignee: Welker, Inc., Sugar Land, TX (US)

( * ) Notice: Subject to any disclaimer, the term of this patent is extended or adjusted under 35 U.S.C. 154(b) by 289 days.

(21) Appl. No.: 12/250,508

(22) Filed: Oct. 13, 2008

(65) Prior Publication Data

US 2010/0089454 A1    Apr. 15, 2010

(51) Int. Cl.
*F16L 55/07*    (2006.01)
(52) U.S. Cl. ............... 137/15.08; 137/15.12; 137/317
(58) Field of Classification Search .............. 137/317, 137/15.08, 15.12, 1
See application file for complete search history.

(56) References Cited

U.S. PATENT DOCUMENTS

| | | | |
|---|---|---|---|
| 3,138,770 A * | 6/1964 | Baum et al. ............... | 137/317 |
| 3,756,266 A | 9/1973 | Artz | |
| 3,822,718 A * | 7/1974 | Peterson ............... | 137/317 |
| 4,155,372 A | 5/1979 | Mills | |
| 4,177,676 A | 12/1979 | Welker | |
| 4,282,894 A | 8/1981 | Mills | |
| 4,345,613 A | 8/1982 | Mills | |
| 4,346,611 A | 8/1982 | Welker | |
| 4,387,592 A | 6/1983 | Welker | |
| 4,631,967 A | 12/1986 | Welker | |
| 4,881,567 A | 11/1989 | Rockower | |
| 5,756,906 A | 5/1998 | Welker | |
| 5,936,168 A | 8/1999 | Welker | |
| 6,085,777 A | 7/2000 | Welker | |
| 6,338,359 B1 | 1/2002 | Welker | |
| 6,827,486 B2 | 12/2004 | Welker | |
| 6,964,517 B2 | 11/2005 | Welker | |
| 2003/0056309 A1 | 3/2003 | Savard | |

* cited by examiner

*Primary Examiner*—Kevin L Lee
(74) *Attorney, Agent, or Firm*—Husch Blackwell LLP

(57) ABSTRACT

A removable automatic insertion device with segmented drainage shaft may be used to remove unwanted liquids from pipelines, tanks and other pressurized vessels. The insertion device inserts and withdraws the drainage shaft, one segment at a time into the pipeline or other pressurized vessel. A termination assembly is connected to the subsurface end of the drainage shaft and includes a normally closed drainage valve assembly. After insertion of the drainage shaft, the automatic insertion device is removed and a surface mounted discharge assembly is connected to the drainage shaft. To open the drainage valve assembly and commence drainage of unwanted liquids, pressurized fluid is injected through the discharge assembly, and a segmented hollow actuation tube to open the subsurface drainage valve assembly. Unwanted fluids then pass through the open drainage valve assembly, the drainage shaft to the surface mounted discharge assembly.

11 Claims, 15 Drawing Sheets

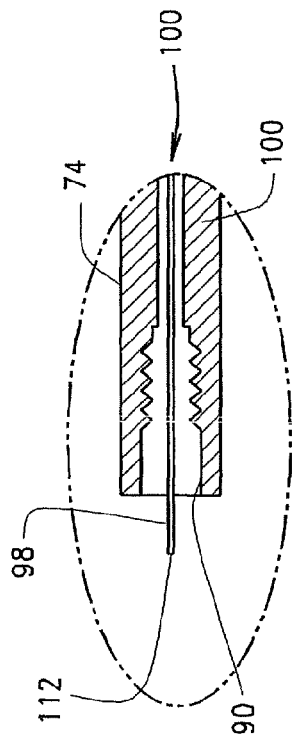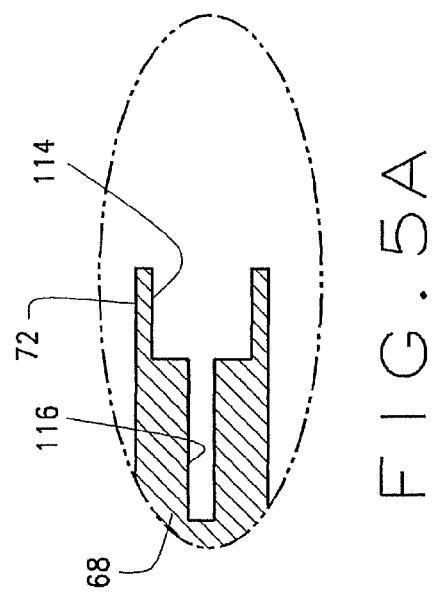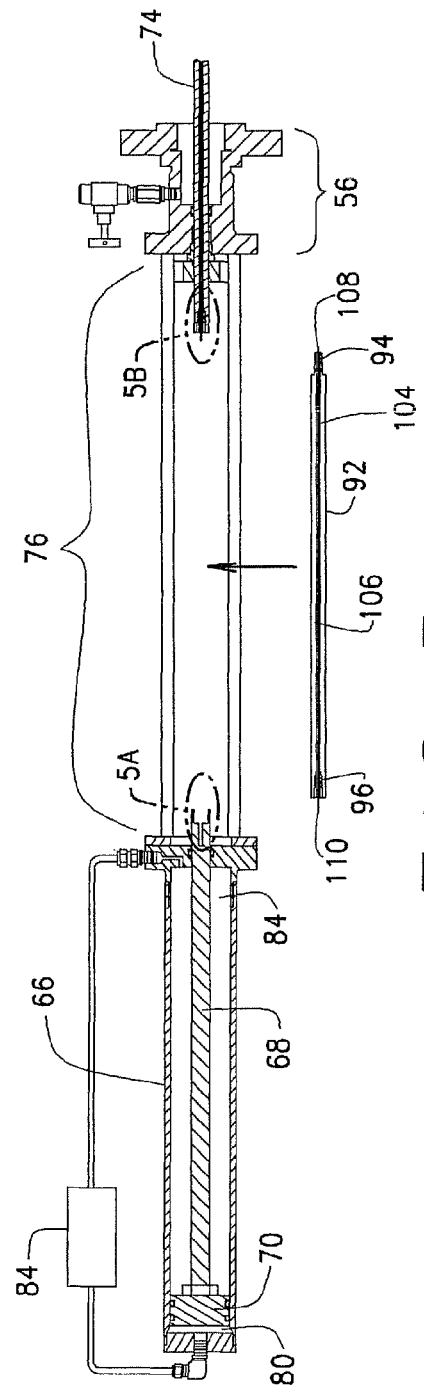

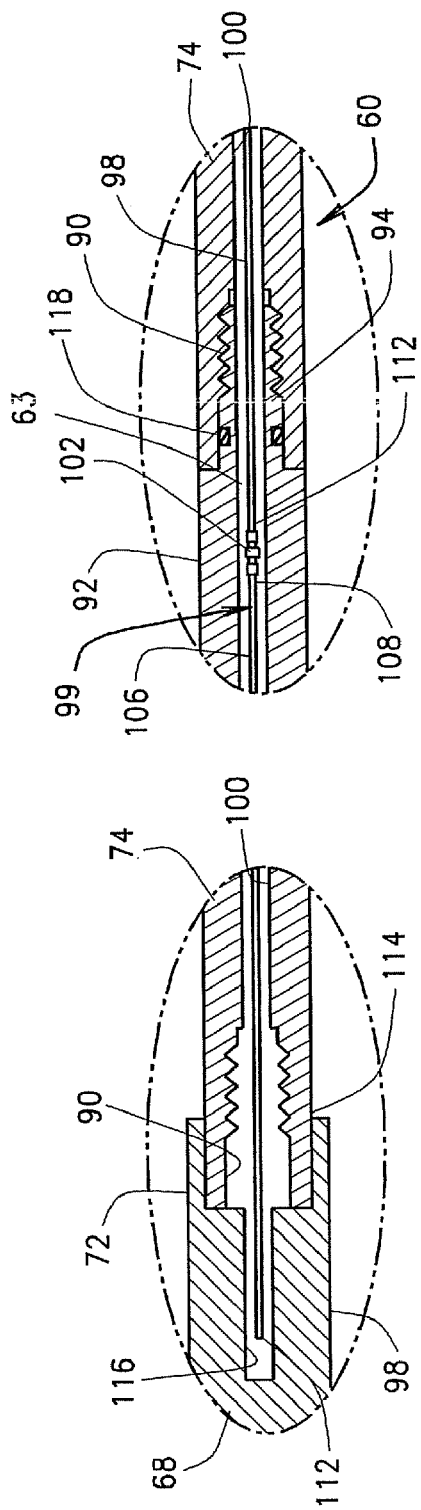
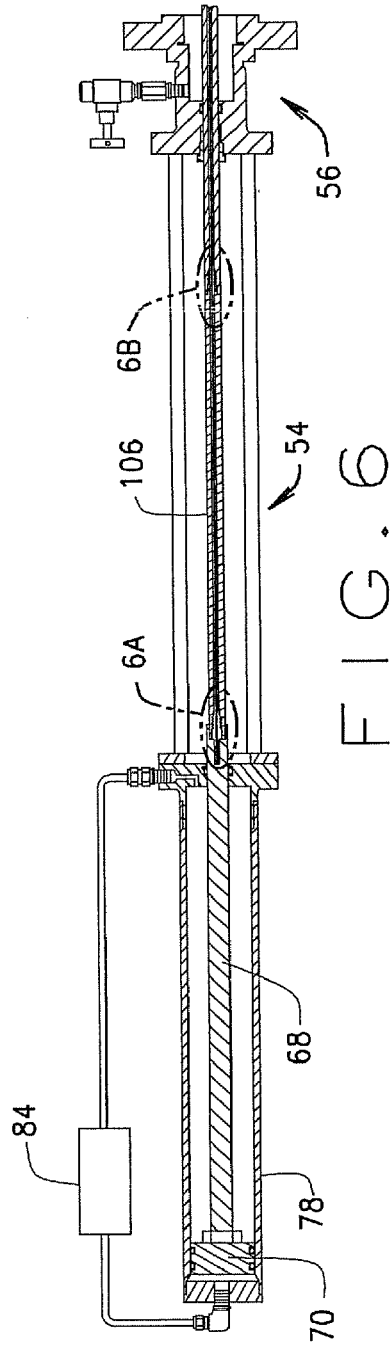

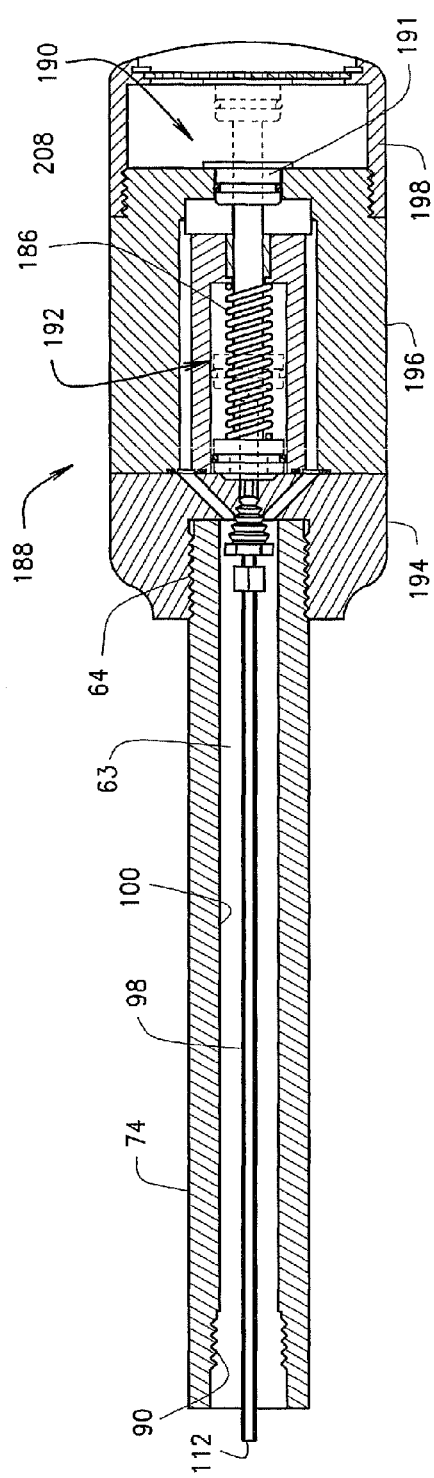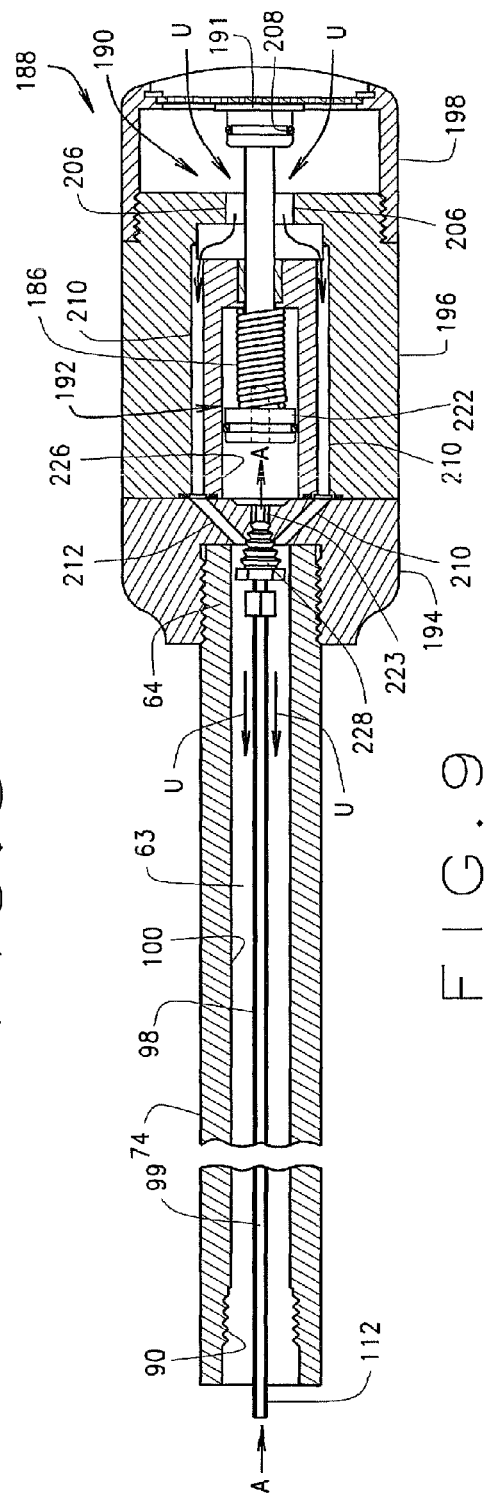

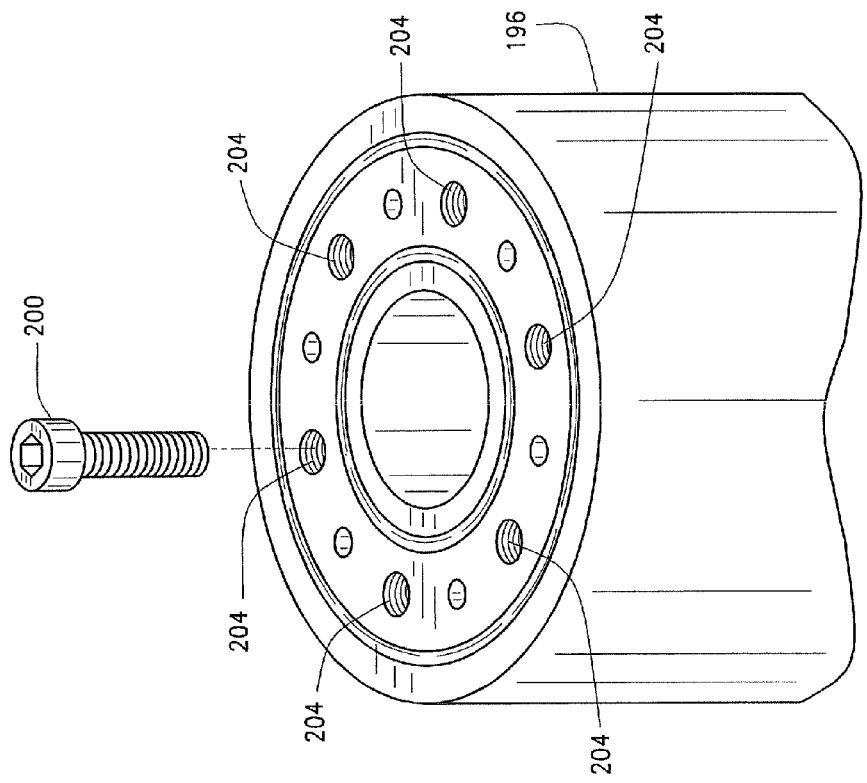
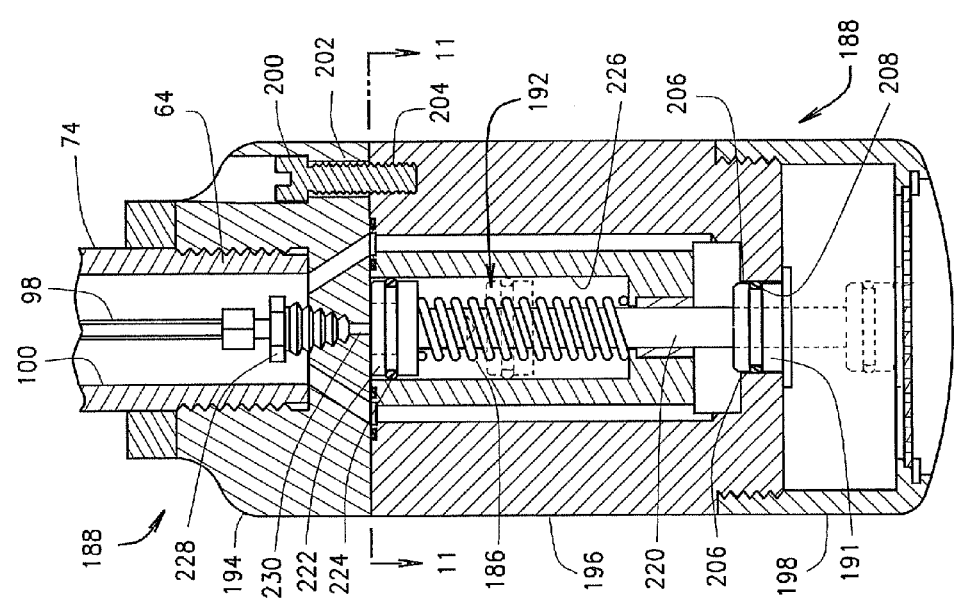
FIG. 11
FIG. 10

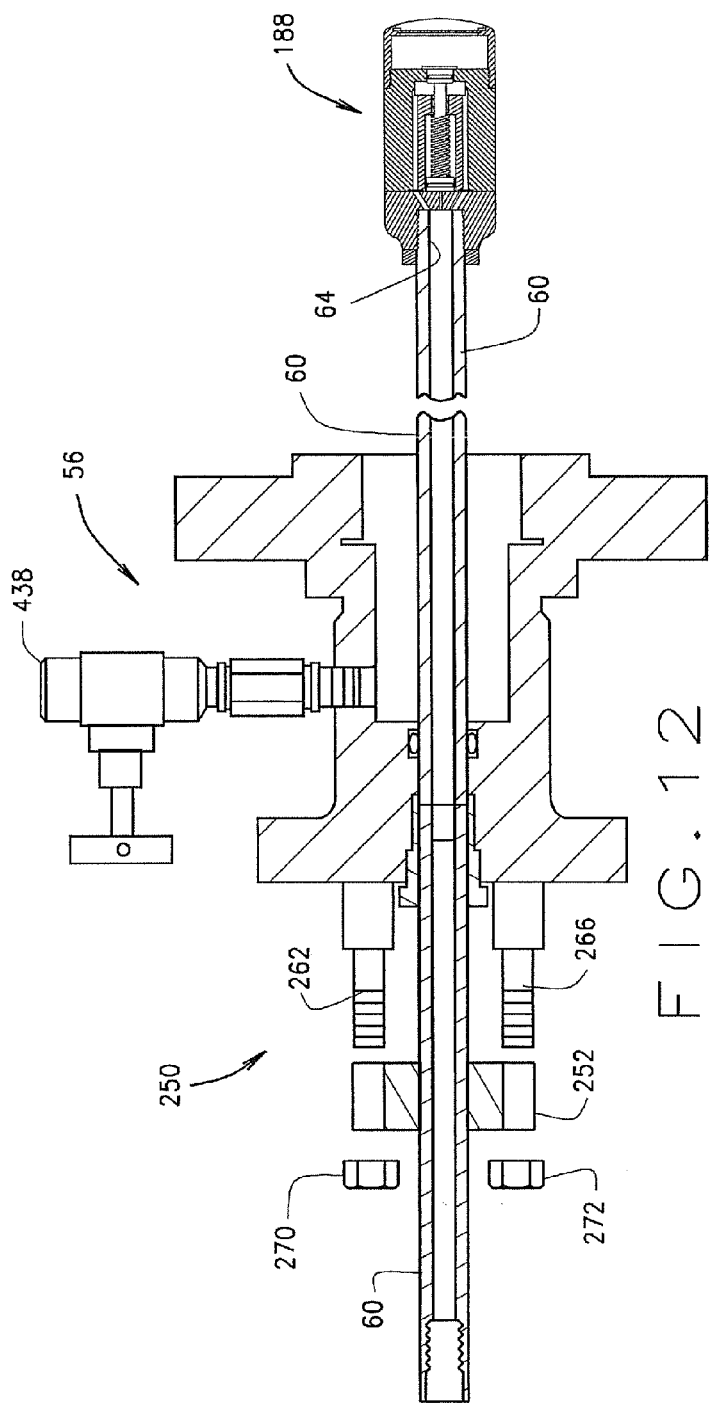
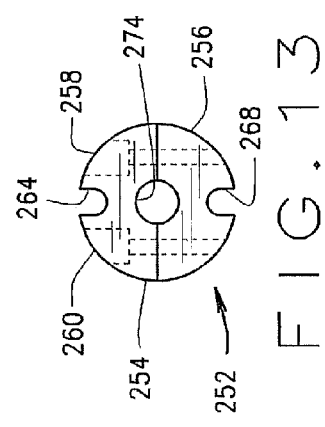
FIG. 12
FIG. 13

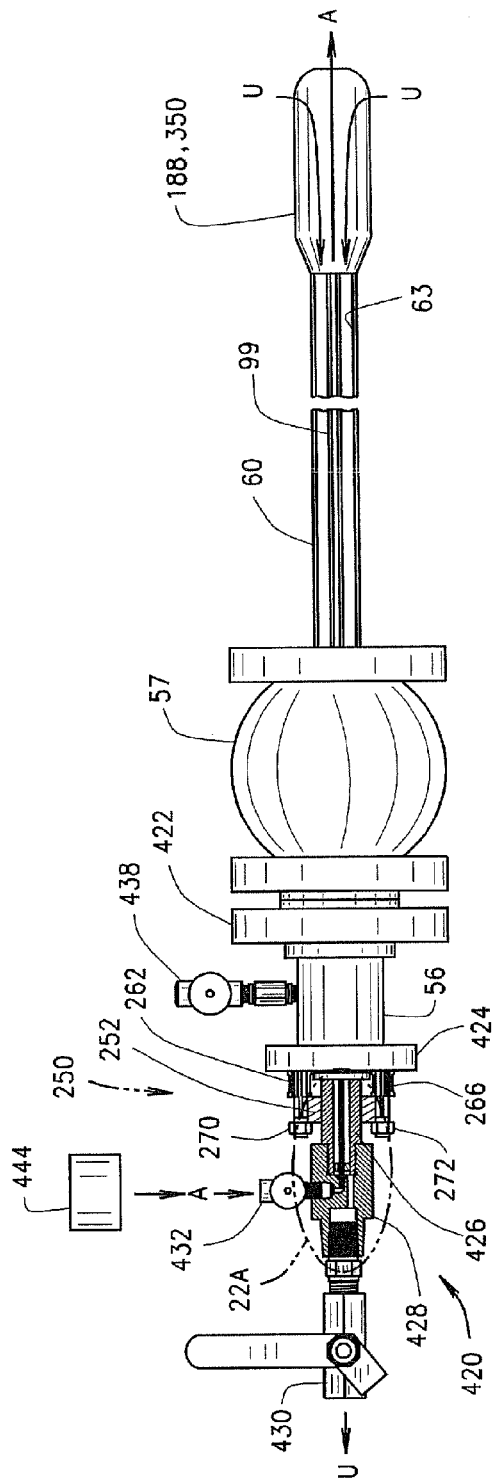
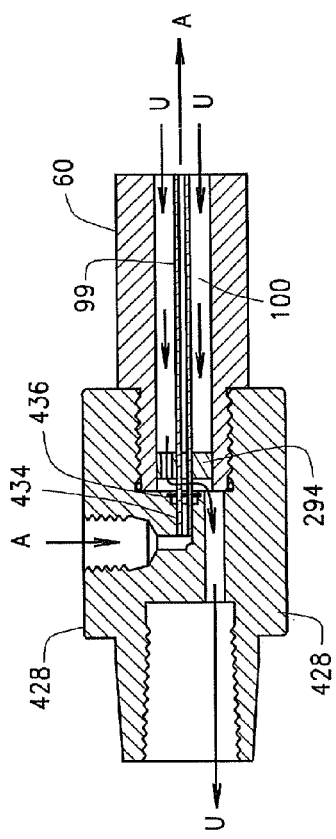
FIG. 22
FIG. 22A

REMOVABLE AUTOMATIC INSERTION DEVICE WITH SEGMENTED DRAINAGE SHAFT

DESCRIPTION OF THE PRIOR ART

Subsurface river crossings and road crossings create a dip or low point in gas pipelines where liquids often accumulate. If the liquids are primarily water they may corrode the pipeline. In the alternative, the liquids may consist primarily of liquid hydrocarbons which may be valuable if recovered. However, any type of liquid may increase compression costs along the gas pipeline thus increasing pipeline operational costs. Slugs of any liquid flowing through a gas pipeline may damage equipment. Any liquid may cause instrument pulsation which results in irregular instrument readings. From an operational perspective, any liquid that accumulates in a gas pipeline is undesirable and will hereinafter be referred to as "unwanted." Unwanted liquids may also accumulate in pressurized tanks and other pressurized vessels.

From the early days, a need has been recognized for a way to clear unwanted liquids from dips and low points in gas pipelines. Blowdowns were an early method to clear a section of pipeline of unwanted liquid. Valves on one end of a section of pipeline were opened and the line was blown long and hard to atmosphere. Large volumes of gas were wasted in addition to salt water and petroleum liquids being blown onto the ground. In the U.S., blowdowns are no longer acceptable from an environmental and economic perspective.

Pipeline pigs have also been used in an attempt to rid pipelines of unwanted liquids. For example, see U.S. Patent Publication No. 2003/00566309 entitled "Pipeline Pig Cleaning Apparatus." Pigs are expensive to use, require a lot of manpower and are not an ideal solution to the problem of unwanted liquids.

A series of patents was issued for a "Pressure-Operated Portable Siphon Apparatus for Removing Concentrations of Liquid From a Gas Pipeline" including U.S. Pat. Nos. 4,155, 372; 4,282,894; 4,345,613 and 4,345,613. The apparatus described in these patents did not extend for more than one pipe diameter into the pipeline and did not have a drainage valve at the foot of the drainage shaft. The apparatus described in these patents is incapable of reaching remote liquid accumulations under wide rivers.

Prior art insertion devices, such as those produced by the Assignee of this Application typically did not have a drainage valve at the foot of the drainage shaft and did not reach more than one pipe diameter into the pipeline. These limitations in typical prior art devices using a single insertion shaft make it impossible for these types of prior art devices to reach unwanted liquids in a dip that may be 50 feet or more away from the surface access location.

Welker, Inc., formerly known as Welker Engineering Company has patented a number of pipeline insertion devices including the following: U.S. Pat. Nos. 4,177,676; 4,346,611; 4,387,592; 4,631,967; 5,756,906; 5,936,168; 6,085,777; 6,338,359; 6,827,486 and 6,964,517. These prior art devices do not have a drainage valve at the foot of the drainage shaft and cannot reach unwanted accumulations of liquids that occur in remote pipeline dips. There remains a need for an insertion device that can be deeply inserted into a pressurized pipeline, tank or other pressurized vessel to remove accumulations of unwanted liquids that are in locations that many prior art devices cannot reach.

U.S. Pat. No. 4,881,567 for a "Liquid Removal System" is unsuitable for a high pressure gas transmission pipeline. Specifically, the flexible diaphragm 37 in the guide shown in FIG. 6 of the '567 Patent is insufficient to seal against gas pressures in a transmission line, or any gas main. The apparatus of the '567 Patent was simply unworkable.

One apparatus that can reach remote liquid accumulations under a wide river crossing is disclosed in U.S. Pat. No. 3,756,266 entitled "Removal of Liquid from Pipe Carrying Gas." However, the device in the '266 Patent is unsuitable for insertion and withdrawal from a high pressure gas transmission line while it is in service. According to the '266 Patent a 16 inch gas pipeline was installed under the Delaware River and after it was put in service, it accumulated liquids at the low point under the river. To solve the problem, the 16 inch pipeline was depressurized and taken out of service.

Four men pushed a 2,100 foot string of ¾ inch drain pipe, with each segment about 20 feet long, to the low point in the 16 inch line. Prior to insertion, a series of holes 14 were drilled in the first two ¾ inch pipe segments to allow the unwanted liquids to enter the drain pipe. The pipeline was then repressurized and put back in service. A surface mounted valve 22, best seen in FIG. 5 of the '266 Patent was then opened allowing the unwanted liquids to be pushed through the ¾ inch drain pipe and to the surface by pressure in the 16 inch pipeline.

The '266 Patent discloses a semi-permanent apparatus that cannot be inserted or withdrawn from the pipeline, once it has been installed, without taking the pipeline out of service, depressurizing the line and removing a subsurface flange 18b, best seen in FIG. 5. There is a unmet need for a better way to reduce remote liquid accumulations in gas pipelines, tanks and other pressurized vessels.

SUMMARY OF THE INVENTION

A removable automatic insertion device is typically connected to a sealed lubricator which is connected to an isolation valve which is connected to a welded fitting in the pipeline, tank or other pressurized vessel. The automatic insertion device inserts the extendable drainage shaft one segment at a time until a termination assembly is in contact with the unwanted liquids. The termination assembly includes a normally closed drainage valve assembly which keeps the pressure in the pipeline or vessel from blowing out through the hollow extendable segmented drainage shaft. The drainage valve assembly is held in the normally closed position by spring pressure.

The present invention can be installed while the pipeline is under construction or afterwards through an isolation valve. If there is no isolation valve at the proper location, a welded filling and insertion valve may be connected to a pipeline through a hot tap while the pipeline is in operation. After an automatic insertion device has been connected to the lubricator, it inserts the extendable drainage shaft into the pipeline, one segment at a time while the pipeline is operational and under full pressure, unlike the '266 Patent. The operational pressures in gas transmission lines may exceed 1000 psi. Each drainage shaft segment of the present invention may be several feet long. When fully extended, the present invention may reach 50 feet or more into a pipeline to remove unwanted accumulations of liquids.

In order to open the subsurface drainage valve assembly, pressurized fluid must be introduced through the surface mounted discharge assembly through a segmented hollow actuation tube located inside the hollow drainage shaft to the subsurface drainage valve assembly to overcome the spring pressure and open the valve.

After full insertion of the extendable segmented drainage shaft it is locked to the lubricator. The automatic insertion device is removed from the lubricator and a surface mounted discharge assembly is connected on the surface to the extendable segmented drainage shaft. Pressurized fluid is directed through the surface mounted discharge assembly, the segmented hollow actuation tube to the termination assembly and the drainage valve actuation assembly to shift the drainage valve assembly from the normally closed to the open position.

When the drainage valve assembly is opened, the unwanted liquids flow through the drainage valve assembly, the termination assembly, the extendable segmented drainage shaft and the surface mounted discharge assembly in response to pipeline pressure which is greater than atmospheric pressure. Depending on the content of the unwanted liquids, they may be disposed of or reused. When the drainage process is completed, the segmented hollow actuation tube is depressurized which causes the drainage valve assembly to move to the normally closed position in response to spring pressure.

When the drainage process is completed, the operator then has three choices as follows: a) Full Insertion, the surface mounted discharge assembly may be left in place while the drainage shaft and termination assembly are fully inserted into the pipeline to expedite drainage operations in the future, b) Partial Withdrawal, the surface mounted discharge assembly may be removed and the automatic insertion device reinstalled on the lubricator to withdraw the drainage shaft from the pipeline and leave the termination assembly withdrawn and in the lubricator which facilitates pigging operations or c) Complete Withdrawal and Removal, the surface mounted discharge assembly may be removed and the automatic insertion device is reinstalled on the lubricator to completely withdraw the drainage shaft from the pipeline into the lubricator. The isolation valve is then closed, the pipeline pressure in the lubricator is bled off and all the equipment is removed from the pipeline, except the isolation valve and the welded fitting.

a) Full Insertion

If the extendable segmented drainage shaft is left in place, the automatic insertion device may be removed and reused in another location. As previously mentioned, the subsurface termination assembly includes a drainage valve assembly that is in a normally closed position due to spring pressure. The spring keeps the drainage valve assembly of the present invention closed unless opened by pressure from hydraulic fluid from a source of pressurized hydraulic fluid located on the surface.

If the surface mounted valve 22 in the '266 Patent was unintentionally sheared off or developed a leak, gas from the pipeline would begin to leak and create a potential hazard. The '226 Patent does not have a subsurface termination assembly with a subsurface drainage valve assembly like the present invention.

b) Partial Withdrawal

If the extendable segmented drainage shaft is withdrawn from the pipeline, the termination assembly fits into a lubricator and is completely removed from the pipeline. This ability to fully withdraw the extendable segmented drainage shaft allows pigs to be run through the pipeline without any damage to the present invention and without taking the pipeline out of service, unlike the '266 Patent. The drainage valve assembly remains closed to prevent escape of gas from the pressurized pipeline, tank or other pressurized vessel.

c) Complete Withdrawal and Removal

There are thousands of subsurface river crossings and/or road crossings in the U.S. and throughout the world. In some countries, labor is relatively inexpensive and equipment is relatively expensive. In the U.S. labor is relatively expensive and equipment may be relatively inexpensive. So depending on the economics of a particular county, it may be desirable to leave the apparatus fully inserted at each crossing. In other countries, it may be desirable to have a drainage crew that moves from crossing to crossing to insert, drain and then completely withdraw and detach the apparatus, before moving on to the next crossing. The welded fitting and the isolation valve will always remain behind at each crossing.

BRIEF DESCRIPTION OF THE DRAWINGS

FIG. 5 is a section view of the automatic insertion device and sealed lubricator with the insertion rod withdrawn into the piston/cylinder and one segment of the extendable segmented drainage shaft locked to the sealed lubricator.

FIG. 5A is an enlargement of a portion of FIG. 5 showing the tip of the insertion rod.

FIG. 5B is an enlargement of a portion of FIG. 5 showing the female end of the first segment of the extendable segmented drainage shaft.

FIG. 6 is a section view of the automatic insertion device and sealed lubricator with the insertion rod withdrawn into the piston/cylinder and a second segment of the extendable segmented drainage shaft inserted into the apparatus.

FIG. 6A is an enlargement of a portion of FIG. 6 showing one end of the insertion rod engaging one end of the second segment of the extendable segmented drainage shaft.

FIG. 6B is an enlargement of a portion of FIG. 6 showing the other end of the fresh segment of the extendable segmented drainage shaft threadably engaging the first segment of the extendable segmented drainage shaft.

FIG. 8 is a section view of the termination assembly mounted on the tip of the extendable segmented drainage shaft. In this view the drainage valve is in the normally closed position. The open position is shown in phantom.

FIG. 9 is a section view of the termination assembly mounted on the tip of the extendable segmented drainage shaft. In this view the drainage valve is in the open position and unwanted liquids are flowing through the valve and the termination assembly as indicated by the flow arrows.

FIG. 10 is an enlarged section view of the termination assembly in FIG. 8.

FIG. 11 is a section view of a portion of the termination assembly along the lines 11-11 of FIG. 10.

FIG. 12 is a section view of the sealed lubricator, the locking assembly and the tip of the extendable segmented drainage shaft with the termination assembly.

FIG. 13 is a top plan view of the locking collar.

FIG. 14A is a section view of the alternative embodiment of the extendable segmented drainage shaft of FIG. 14. In this view the two segments are connected.

FIG. 22 is a partial section view of the external termination assembly.

FIG. 22A is an enlargement of a portion of the external termination assembly of FIG. 22.

DETAILED DESCRIPTION OF THE INVENTION

Figure 1:
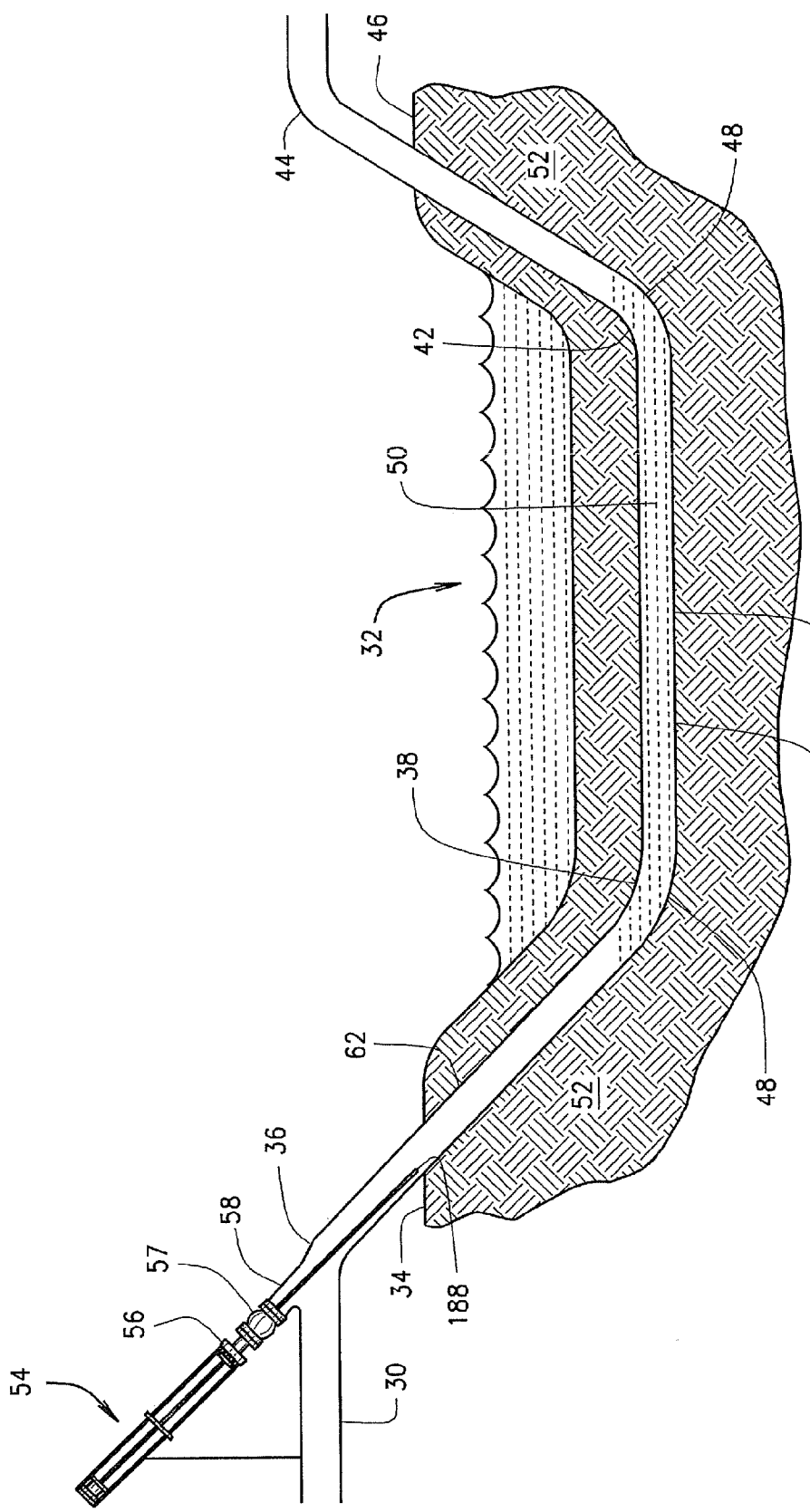
FIG. 1 is a schematic of the removable automatic insertion device mounted on a pipeline and inserting the extendable segmented drainage shaft a portion of the way to the unwanted liquids.

FIG. 1 is a schematic of the removable automatic insertion device 54 mounted on a pipeline 30; the removable automatic insertion device 54 has inserted the extendable segmented drainage shaft 60 and termination assembly 188 a portion of the way to the unwanted liquids 50. A pipeline 30 crosses under a river 32. The near bank pipeline surface access location 34 is above ground. In some instances the pipeline river approach may be below ground. The pipeline makes a 45° bend 36 and descends into the ground 52 below the river 32 where the pipeline makes a second 45° bend 38. The under water conduit 40 is below the river bottom to avoid anchor dragging and other problems with river traffic, but in some instances the under water conduit may be on the river bottom. The pipeline makes another 45° bend 42 and heads upward above ground where is makes another 45° bend 44 and joins the far bank surface access location 46. The dip 48 in the pipeline occurs generally between the 45° degree bend 38 and the 45° bend 42 in the under water conduit 40. The unwanted liquids 50 accumulate at the bottom of the dip 48 in this and other subsurface river and road crossings.

The automatic insertion device 54 is removably attached to the sealed lubricator 56 which is typically bolted on an isolation valve 57 which is connected to a welded fitting 58. The sealed lubricator 56 may also be simply referred to as a connector. Any type of isolation valve may be suitable, provided that it is rated for the maximum allowable operating pressure (MAOP) of the pipeline. The fitting 58 may be welded to the pipeline proximate the bend 36. An Latrolet® from Bonney Forge, Inc. of Mount Union, Pa. may be used as the fitting 58, or any other suitable fitting from other vendors.

As shown in this figure, the extendable segmented drainage shaft 60 has been extended partially into conduit 62, but has not yet reached the pipeline dip 48 containing the unwanted liquids 50. The angle formed by the pipeline 30 and the removable automatic insertion device 54 in this application is acute in order for the extendable segmented drainage shaft 60 to be properly aligned with conduit 62 so the tip 188 of the extendable segmented drainage shaft 60 can reach the dip 48 and the unwanted liquids 50. The removable automatic insertion device 54 may be oriented at various angles in order to reach the unwanted liquids, depending on the application.

Most of the prior art devices described at the beginning of this application were mounted on an above ground pipeline. In these circumstances, the insertion shaft was unsegmented and did not extend more than one pipeline diameter into the pipeline as measured from the fitting connected to the pipeline.

Some prior art devices produced by the Assignee of this Application, were mounted on below ground pipelines. In these below ground situations, the insertion shaft was unsegmented and did not extend more than one pipeline diameter into the pipeline as measured from the fitting connected to the pipeline. However, the unsegmented shaft outside of the pipeline was several feet long in order to reach the surface of the ground. These elongate unsegmented shafts used in underground pipeline applications by Assignee were cumbersome to transport and install and were expensive to produce. Some of these elongate unsegmented shafts used by Assignee in underground pipeline applications were 10 to 15 feet long. There is still a need for an improved automatic insertion device with a segmented drainage shaft that is easy and economical to produce, transport and install and can reach distant accumulations of unwanted liquids. The extendable segmented drainage shaft 60 with termination assembly 188, 350, among other features, is a breakthrough that has helped to solve this long felt and unsolved industry need concerning accumulated liquids.

Figure 2:
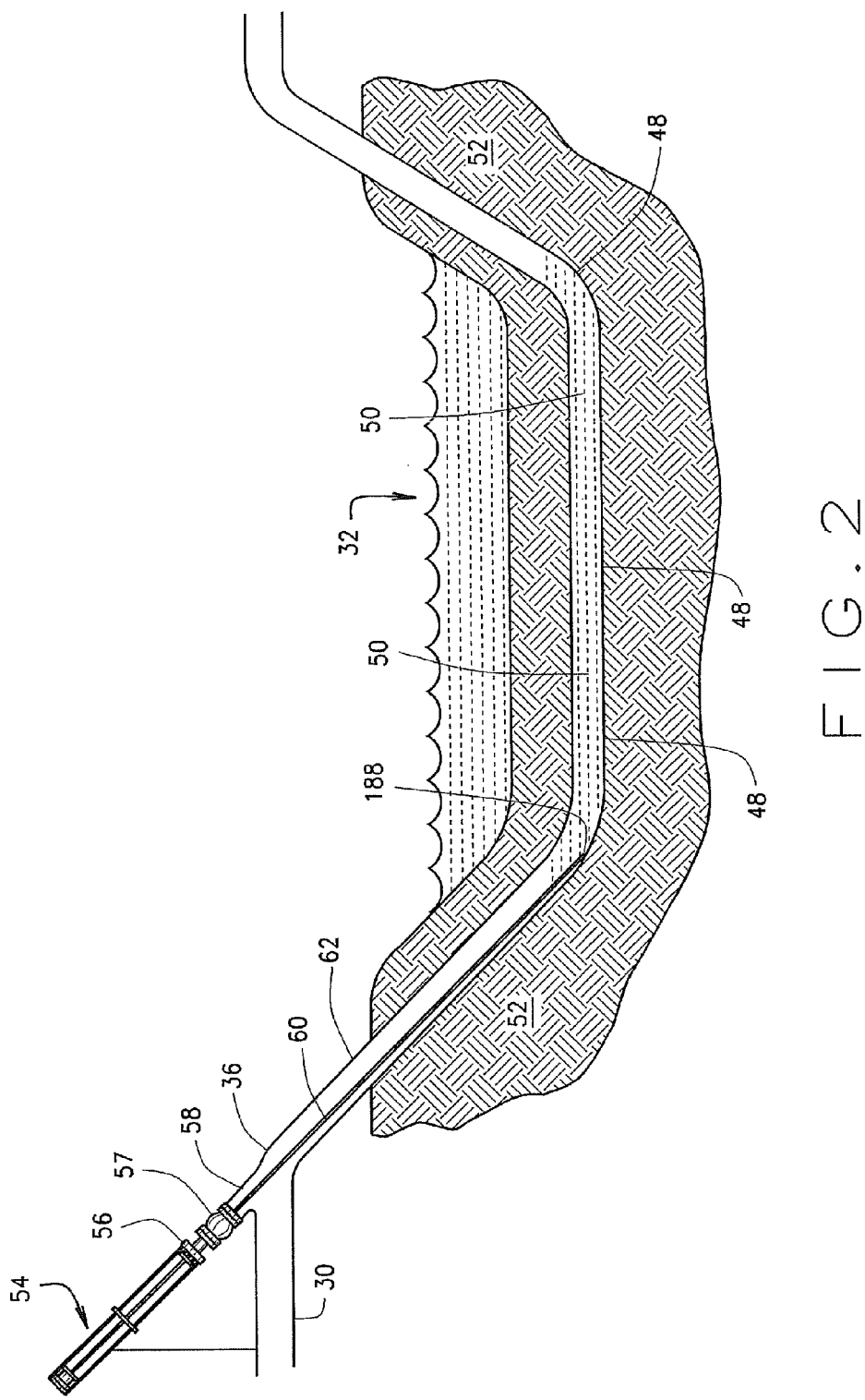
FIG. 2 is identical to FIG. 1, except the extendable segmented drainage shaft has been fully inserted to the pipeline dip and into contact with the unwanted liquids.

FIG. 2 is identical to FIG. 1, except the termination assembly 188, better seen in FIGS. 8 and 9, of the extendable segmented drainage shaft 60 has been fully inserted to the pipeline dip 48 and into contact with the unwanted liquids 50. The extendable segmented drainage shaft 60 has some amount of flexibility and after it has been extended several yards into the pipeline, it begins to bend and run along the bottom of the pipeline as it is inserted. FIGS. 1 and 2 are merely illustrations of this flexibility and the actual flexibility may vary depending on the application, segment lengths and other factors. This flexibility is advantageous, because it positions the termination assembly 188 of the extendable segmented drainage shaft 60 at the bottom of a bend or dip to drain a substantial amount of unwanted liquid 50 from the pipeline 30. The extendable segmented drainage shaft 60 should be extended as far as possible into contact with the unwanted liquids 50 before the drainage process begins.

Figure 3:
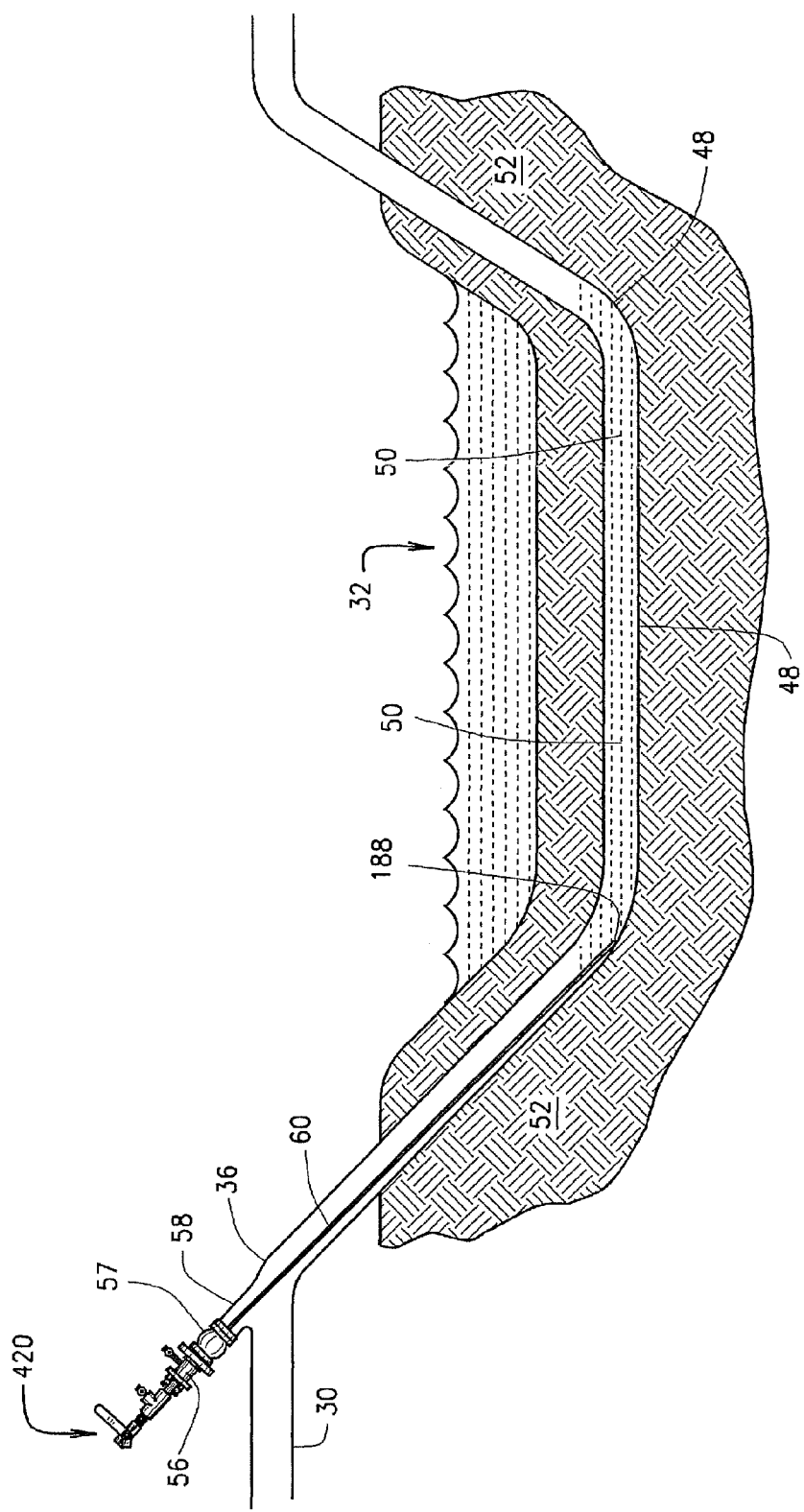
FIG. 3 is identical to FIG. 2, except the automatic insertion device has been removed from the sealed lubricator.

FIG. 3 is identical to FIG. 2, except the removable automatic insertion device 54 has been removed from the lubricator 56. The surface mounted discharge assembly 420 has been installed on the extendable segmented drainage shaft 60 in order to begin draining the unwanted liquids 50 from the pipeline. Details of the surface mounted discharge assembly 420 are better seen in FIGS. 22 and 22A.

Figure 4A:
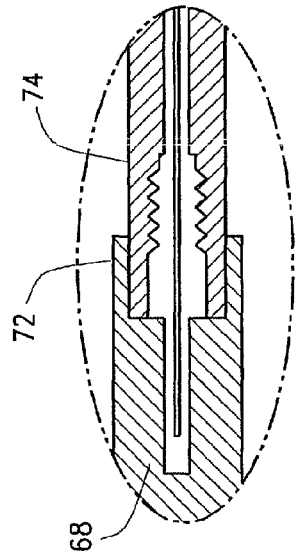
FIG. 4A is an enlargement of a portion of FIG. 4 with the insertion rod engaging the first segment of the extendable segmented drainage shaft.
Figure 4:
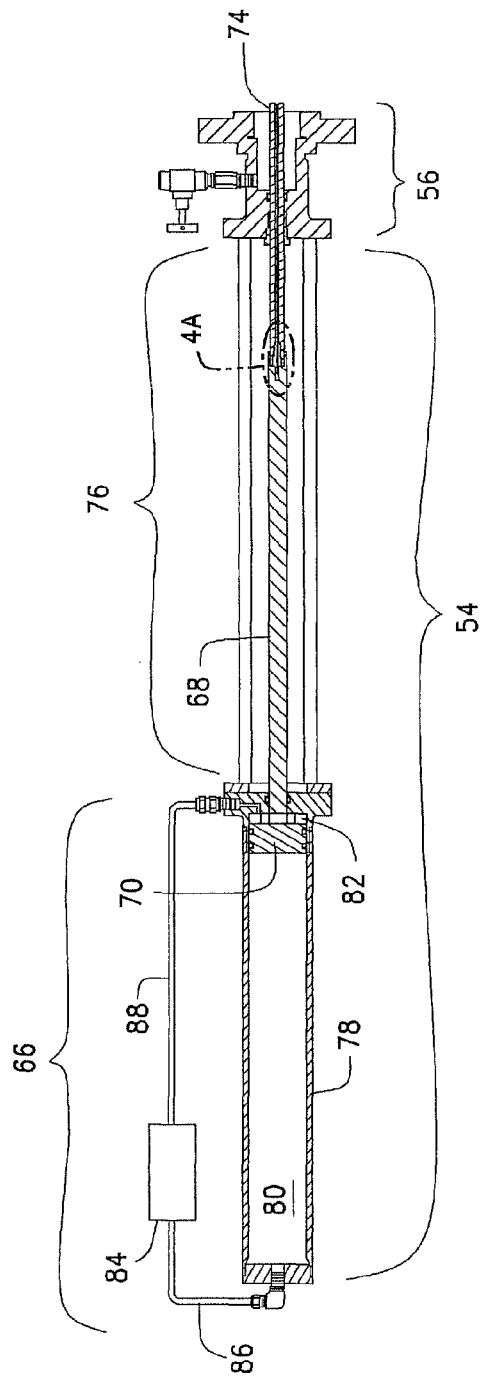
FIG. 4 is a section view of the automatic insertion device and sealed lubricator.

FIG. 4 is a section view of the removable automatic insertion device 54 and sealed lubricator 56. FIG. 4A is an enlargement of a portion of FIG. 4 with the insertion rod 68 engaging the first segment 74 of the extendable segmented drainage shaft 60. The removable automatic insertion device is generally identified by the bracket 54. The removable automatic insertion device 54 includes the double acting piston/cylinder, generally identified by the bracket 66 and the stand off assembly, generally identified by the bracket 76 of FIG. 4. The double acting piston/cylinder 66 includes an insertion rod 68 and a moveable piston 70. The insertion rod 68 moves from an extended position shown in FIG. 4 to a retracted position shown in FIG. 5. The tip 72 of the insertion rod 68 has engaged the first segment 74 as shown in the enlargement FIG. 4A.

A cylinder 78 and the piston 70 define an extension chamber 80 and a retraction chamber 82. A first source of pressurized fluid 84 is in fluid communication with the extension chamber 80 via the first conduit 86 and the retraction chamber 82 via a second conduit 88. When pressurized fluid from the first source of pressurized fluid 84 is pumped to the extension chamber 80, it drives the piston 70 to the position shown in FIG. 4 moving the insertion rod 68 into the extended position shown in FIG. 4. When pressurized fluid is vented from the extension chamber 80 and pumped to the retraction chamber 82, it drives the piston 70 into the retracted position shown in FIG. 5.

FIG. 5 is a section view of the removable automatic insertion device 54 and sealed lubricator 56 with the insertion rod 68 retracted into the double acting piston/cylinder 66 and the first segment 74 of the extendable segmented drainage shaft 60 locked to the sealed lubricator 56 by the locking assembly 250, better seen in FIGS. 12 and 13. FIG. 5A is an enlargement of a portion of FIG. 5 showing the tip 72 of the insertion rod 68. FIG. 5B is an enlargement of a portion of FIG. 5 showing the female end 90 of the first segment 74 of the extendable segmented drainage shaft 60.

Each segment of the extendable segmented drainage shaft 60 may be several feet long, depending on the application, the customer's specifications and other factors. For example, to extend the extendable segmented drainage shaft 60 to lengths of 50 feet or more, it is necessary to sequentially connect and extend several segments to reach the dip 48 and the unwanted liquids 50. If each segment is 3 feet long, it would take about 17 segments to extend the elongate drainage shaft about 50 feet to reach the dip and the unwanted liquids.

FIG. 1 shows the extendable segmented drainage shaft 60 in a partially extended position. FIG. 2 shows the extendable segmented drainage shaft 60 fully extended to the dip 48 and in contact with the unwanted liquids 50.

A second segment 92 includes a threaded male end 94 and a threaded female end 96. As the arrow 2 indicates, the second segment 92 is inserted into the stand off assembly 76.

Referring to FIGS. 5A and 5B, a first joint 98 of the hollow actuation tube 99, better seen in FIG. 6B, is located in a hollow axial center 100 of the first segment 74. Each segment of the extendable segmented drainage shaft 60 has a hollow axial center and a joint of the hollow actuation tube 99.

The second segment 92 has a hollow axial center 104. A second joint 106 of the hollow actuation tube 99 is located in the hollow axial center 104 of the second segment 92 of the extendable segmented drainage shaft 60. The second joint 106 of the hollow actuation tube 99 has a first end 108 and a second opposite end 112. The second end 110 extends out beyond the end of the second segment 92 of the extendable segmented drainage shaft 60.

Referring to FIG. 5B and 6B, the second end 112 of the first joint 98 of hollow actuation tube 99 extends beyond the female end 90 of the first segment 74. The second end 112 of the first joint 98 of the hollow actuation tube 99 is manually connected to the first end 108 of the joint 106 of the hollow actuation tube 99 by the tubing union 102, best seen in FIG. 6B. The male end 94 of the second segment 92 of the extendable segmented drainage shaft 60 is then threaded into the female end 90 of the first segment 74 of the extendable segmented drainage shaft 60. In this fashion, two segments of the extendable segmented drainage shaft 60 have been connected. Each additional shaft segment is connected in like fashion, similar to the drill string of an oil well. Two joints of the hollow actuation tube 99 have been connected by the tubing union 102, as best seen in FIG. 6B. Each additional joint of the hollow actuation tube 99 is connected in like fashion.

Referring now to FIG. 5A, the tip 72 of the insertion rod 68 defines a hollow receptacle 114, sized and arranged to fit over the female end of each segment of the extendable segmented drainage shaft 60. The receptacle 114 further includes a counter bore 116 sized and arranged to receive the protruding elongate end 112 of first joint 98 of the actuation tube 99. This non-threaded arrangement with the insertion rod 68 speeds up the insertion process of the extendable segmented drainage shaft which proceeds one segment at a time.

FIG. 6 is a section view of the removable automatic insertion device 54 and sealed lubricator 56 with the insertion rod 68 retracted into the cylinder 78 and a second segment 92 of the extendable segmented drainage shaft 60 has been connected to the first segment 74 of the extendable segmented drainage shaft 60. FIG. 6A is an enlargement of a portion of FIG. 6 showing the tip 72 of the insertion rod 68 engaging the female end 96 of the second segment 92 of the extendable segmented drainage shaft 60.

FIG. 6B is an enlargement of a portion of FIG. 6 showing the first segment 74 connected to the second segment 92 of the extendable segmented drainage shaft 60. Specifically, the threaded male end 94 of the second segment 92 of the extendable segmented drainage shaft 60 threadably engages the threaded female end 96 of the first segment 74 of the extendable segmented drainage shaft 60. The first segment 74 of the extendable segmented drainage shaft 60 was previously inserted into the pipeline 30. The tubing union 102 connects the first joint 98 to the second joint 106 of the hollow actuation tube 99.

The hollow actuation tube 99, best seen in FIG. 6B, runs the length of the hollow extendable segmented drainage shaft 60. Like the extendable segmented drainage shaft 60, the hollow actuation tube 99 is composed of joints each of which are connected end to end by a tubing union 102, best seen in FIGS. 6B and 7.

Figure 7:
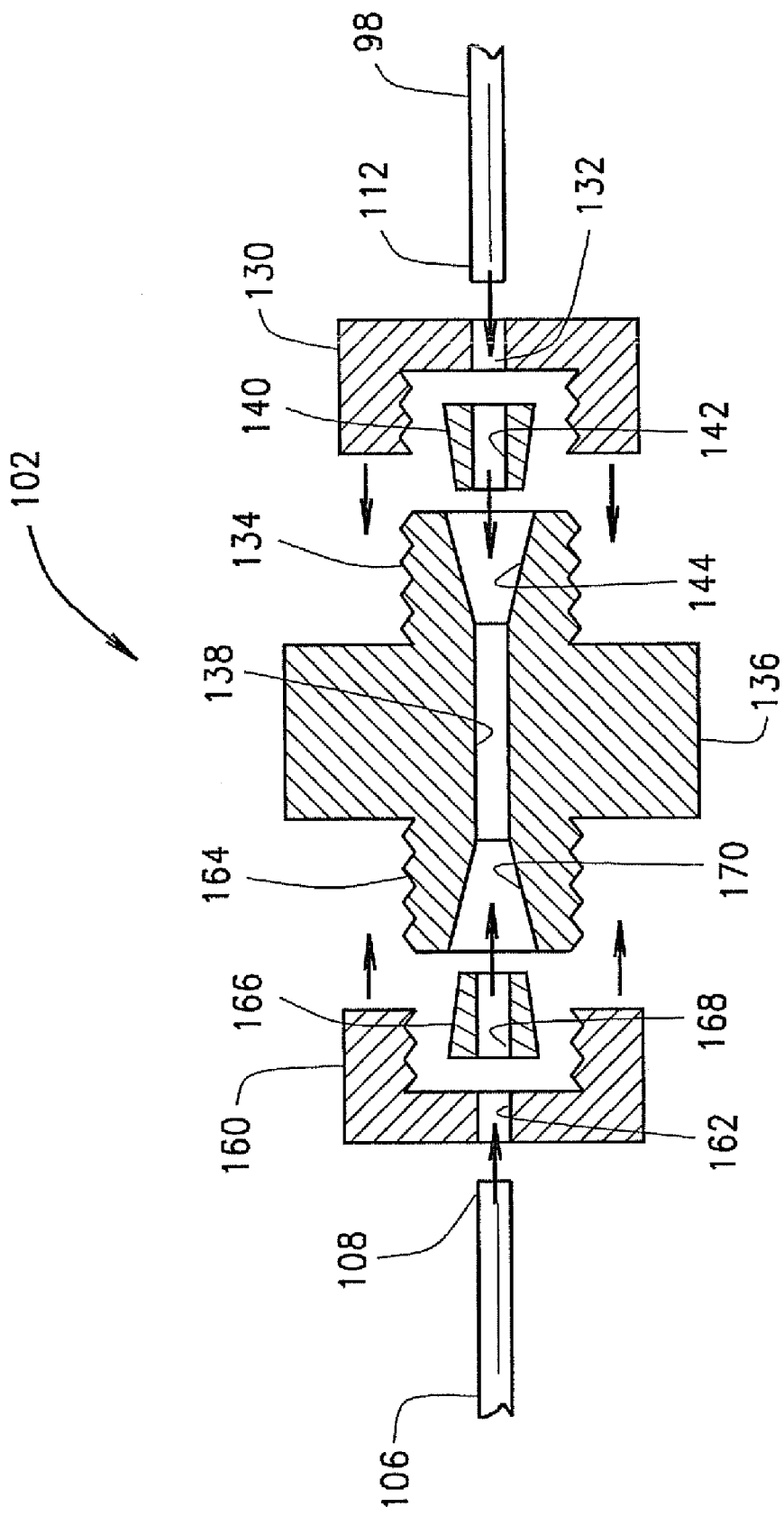
FIG. 7 is an exploded section view of a tubing union.

FIG. 7 is an exploded section view of the tubing union 102 which is an off the shelf item. A right cap 130 defines a central hole 132, sized and arranged to receive the second end 112 of the first joint 98 of a hollow actuation tube 99. The right cap 130 threadably engages the right extension 134 from the base 136 which defines a central passageway 138. A right conical seal 140 defines a central hole 142 sized and arranged to receive the second end 112 of the first joint 98 of the hollow actuation tube 99. When the right cap 130 is threaded on the right extension 134, it compresses the seal 140 in the right conical receptacle 144 to create a press fit seal between the tubing union 102 and the first joint 98 of hollow actuation tube 99. The left cap 160 defines a central hole 162 which is sized and arranged to receive the end 108 of the second joint 106 of hollow actuation tube 99. The left cap 160 threadably engages the left extension 164. The left conical seal 166 defines a hole 168 that is sized and arranged to receive the first end 108 of the first joint 98 of the hollow actuation tube 99. The left conical seal 166 is a press fit into the left conical receptacle 170 of the left extension 164. In this fashion, the first joint 98 is connected to the second joint 106 of the hollow actuation tube 99 by the tubing union 102.

FIG. 8 is a section view of the termination assembly generally identified by the numeral 188 mounted on the tip 64 of the first segment 74 of the extendable segmented drainage shaft 60. In this view, the drainage valve assembly 190 is in the normally closed position due to pressure from spring 186. The open position is shown in phantom.

FIG. 9 is a section view of the termination assembly 188 mounted on the tip 64 of the first segment 74 of the extendable segmented drainage shaft 60. In this view, the drainage valve assembly 190 is in the open position and unwanted liquids 50 are flowing past the valve element 191 and through the passageways 210 and 212 termination assembly 188 as indicated by the flow arrows U. FIG. 10 is an enlarged section view of the termination assembly 188 in FIG. 8. FIG. 11 is a section view along the line 11-11 of FIG. 10.

Referring to FIGS. 8, 9, 10 and 11 the termination assembly 188 has an upper body element 194, a middle body element 196 and a lower body element 198. The upper body element threadably engages the tip 64 of the first segment 74 of the extendable segmented drainage shaft 60. The lower body element 198 threadably engages the middle body element 196. A plurality of cap screws 200 or other suitable fastening means, better seen in FIG. 11, slide into a plurality of bores 202 in the upper body element 194 and threadably engage a plurality of threaded bores 204 in the middle body element 196, thus connecting the upper body element 194 to the middle body element 196.

Referring now to FIG. 9, the drainage valve assembly 190 is in the open position. In order to move the drainage valve assembly 190 from the closed position of FIG. 8 into the open position of FIG. 9, hydraulic actuation fluid from the second source of pressurized fluid 444, better seen in FIG. 22, is pumped through the hollow actuation tube 99 as indicated by the flow arrow A into the cylinder 226. When the valve element 191 opens, unwanted liquids 50 flow past the valve element 191, the valve seat 206, and through the flow passageway 210 in the middle body element 196, through the flow passageway 212 in the upper body element 194 and into the annulus 214 formed between the first segment of the segmented hollow actuation tube 99 and the first segment 74 of the extendable segmented drainage shaft 60, out of the pipeline, as indicated by the flow arrows U in FIG. 22. An O-ring 208 surrounds the valve element 191 and seals against the valve seat 206 when the drainage valve assembly 190 is in the closed position as better seen in FIG. 8.

Referring now to FIG. 10, the drainage valve actuation assembly 192 includes the following. A piston rod 220 extending from the valve element 191 on one end to a piston 222 on the other end. An O-ring 224 surrounds the piston 222 and seals against a cylinder 226. The first joint 98 of the hollow actuation tube 99 is connected to a fitting 228 which threadably engages the upper body element 194. The first joint 98 of hollow actuation tube 99 is in fluid communication with a passageway 230 in the upper body element 194.

Referring back to FIG. 9, hydraulic fluid flows from a source of pressurized hydraulic fluid 444 better seen in FIG. 22, through the hollow actuation tube 99, the fitting 228, the passageway 230 into the cylinder 226 which pushes the piston 222 towards the lower body element 198. As the piston 222 moves, the rod 220 unseats the valve element 191 from the valve seat 206, moving the drainage valve assembly 190 into the open position of FIG. 9. Unwanted liquid flows through the termination assembly 188 as indicated in the flow arrows of FIG. 9.

FIG. 12 is a section view of the sealed lubricator 56, the locking assembly generally identified by the numeral 250 and the termination assembly 188 on the tip 64 of the extendable segmented drainage shaft 60. FIG. 13 is a top plan view of the locking collar 252. As previously mentioned, the sealed lubricator 56 may also be generically referred to as a connector to engage the isolation valve 57, better seen in FIG. 3. The termination assembly 188 may be fully withdrawn into the sealed lubricator 56 to allow pigs to pass through the pipeline.

The locking collar 252 includes two separate elements: a first element 254 and a second element 256 connected by a first bolt 258 and a second bolt 260 shown in phantom in FIG. 13. The first element 254 is placed around the first segment 74 and the second element is likewise placed around the first segment 74. The two bolts 258 and 260, are then inserted into the first and second elements of the locking collar 252 to securely join the two elements of the locking collar 252 to the first segment 74.

The locking assembly 250 further includes a first threaded locking lug 262 which extends from the lubricator 56 and engages a first cut-out 264 in the locking collar 252. The locking assembly 250 further includes a second threaded locking lug 266 which extends from the lubricator 56 and engages a second cut-out 268 in the locking collar 252. A first nut 270 threadably engages first threaded locking lug 262 and a second nut 272 threadably engages second threaded locking lug 266 to secure the locking collar 252 to the lubricator 56. The locking collar 252 has a central opening 274 which surrounds and grips the first segment 74. In this manner, the first segment 74 is secured to the lubricator 56 and pipeline pressure will not blow the termination assembly 188 back into the lubricator 56. As each segment of the extendable segmented drainage shaft 60 is inserted into the pipeline, it will be necessary to secure the locking collar 252 to the new segment and engage the locking assembly 250 to the lubricator 56, in order to prevent the termination assembly 188 being ejected back into the lubricator 56 due to pipeline pressure.

Figure 14:
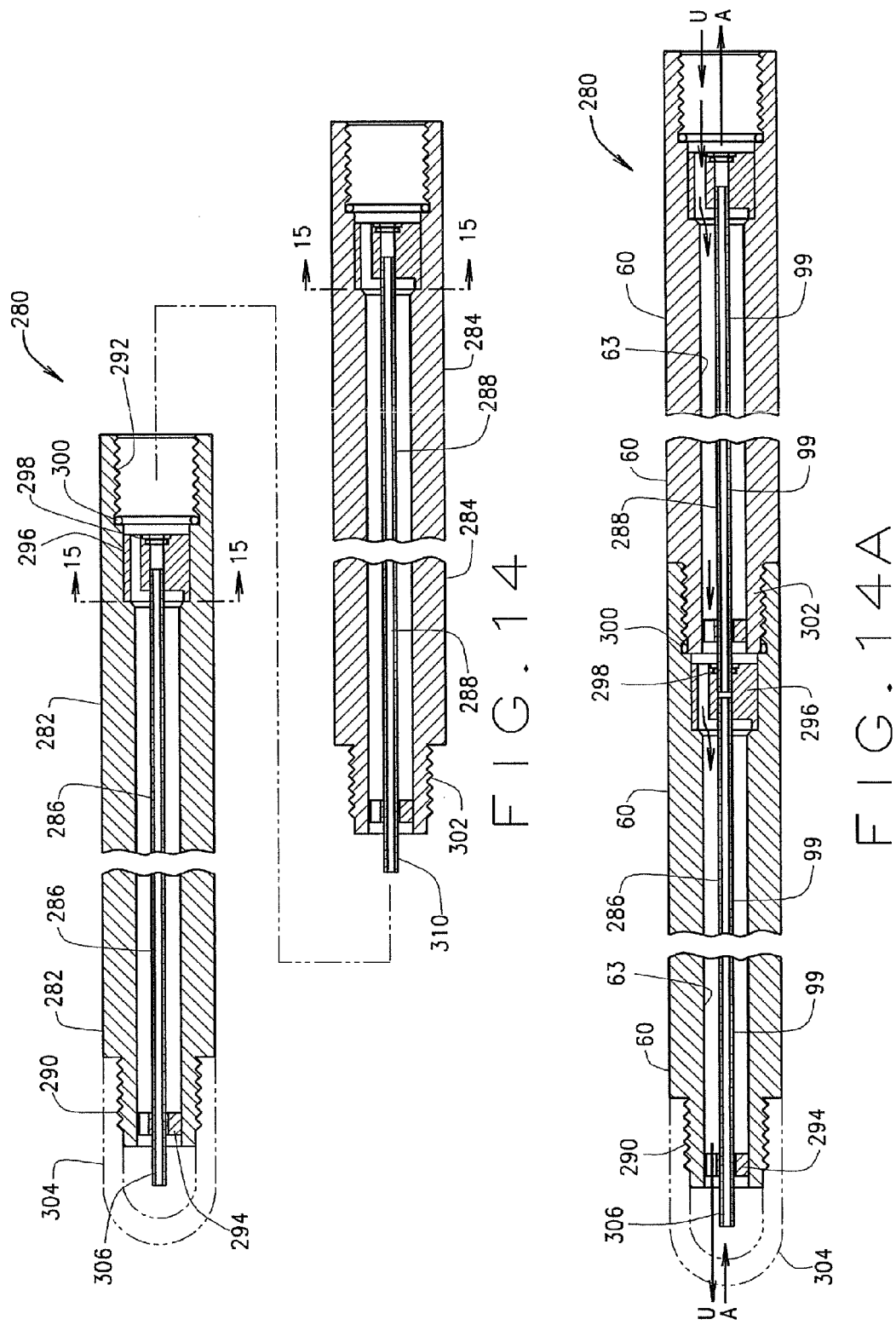
FIG. 14 is a section view of an alternative embodiment of the extendable segmented drainage shaft. In this view two segments are disconnected.

FIG. 14 is a section view of an alternative embodiment 280 of the extendable segmented drainage shaft. In this view, two shaft segments 282 and 284 are disconnected. FIG. 14A is a section view of the alternative embodiment 280 of the extendable segmented drainage shaft 60 and the two shaft segments 282 and 284 are connected. This alternative embodiment does not use a tubing union 102 like the extendable segmented drainage shaft 60. Instead, the alternative embodiment 280 uses a stab and seal system to connect the first joint 286 and the second joint 288 of the hollow actuation tube 99.

Referring now to the first segment 282 of the extendable segmented drainage shaft in FIG. 14, there is a threaded male end 290 and a threaded female end 292. Each segment has a similar configuration so they can fit together as seen in FIG. 14A. The first joint 286 of the hollow actuation tube 99 is secured on one end by an upper tubing anchor 294 and on the other end by the lower tubing anchor 296. An O-ring 298 is positioned in the lower tubing anchor 296. An O-ring 300 is positioned in the threaded female end 292 of the first segment 282 of the extendable segmented drainage shaft 60. O-ring 298 seals the tip 301 of the second joint 288 of the hollow actuation tube 99 when it is stabbed into the lower tubing anchor 296, as better seen in FIG. 14A. The O-ring 300 seals the threaded female end 292 of the first segment 282 to the male end 302 of the second segment 284 of the alternative embodiment 280 of the extendable segmented drainage shaft 60 as better seen in FIG. 14A. Each segment of the alternative embodiment 280 is formed in the same manner.

Figure 17:
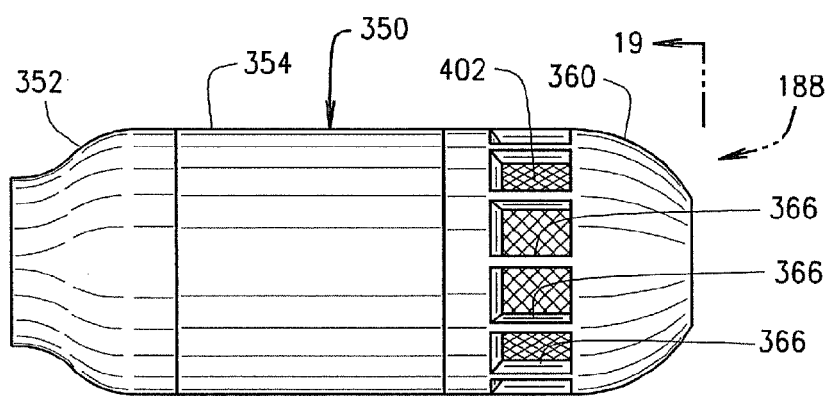
FIG. 17 is a perspective view of an alternative embodiment of the termination assembly.
Figure 19:
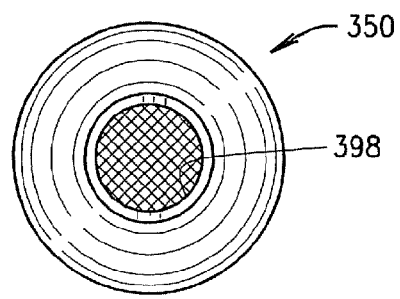
FIG. 19 is an end view of the alternative embodiment of the termination assembly along the line 19-19 of FIG. 17.
Figure 18:
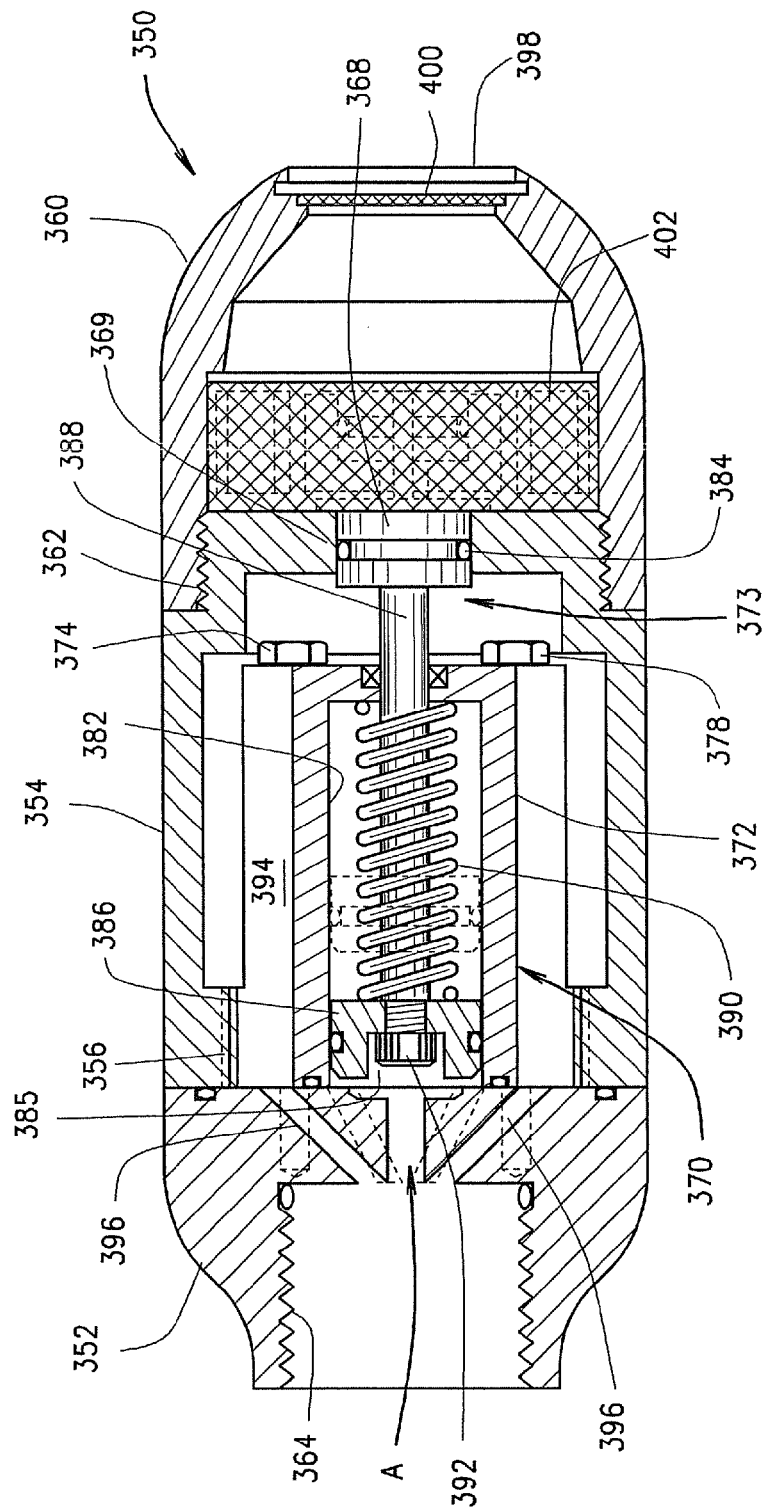
FIG. 18 is a section view of the alternative embodiment of the termination assembly of FIG. 17.

Hydraulic actuation fluid, indicated by the flow arrows A in FIG. 14A flows through the segmented hollow actuation tube 99 towards the alternative embodiment 350 of the termination assembly, better seen in FIGS. 17, 18 and 19. The purpose of the hydraulic actuation fluid is to open the drainage valve element 368 as better seen in FIG. 18 which allows the unwanted liquids 50 to flow back up the extendable segmented drainage shaft 60, as indicated by the flow arrows U in FIG. 14A and out of the pipeline.

A cap 304, shown in phantom threadably engages the male end 290 to protect the tip 306 of the first joint 286 of the hollow actuation tube 99 as best seen in FIG. 14. The upper tubing anchor 294 and the lower tubing anchor 296 have a similar shape, except the lower tubing anchor has an O-ring 298 and the upper tubing anchor does not, as better seen in the following figures. The lower anchor 296 is also larger than the upper tubing anchor 294.

The upper tubing anchor 294 is a press fit, or in the alternative, it may be TIG welded or silver soldered in place. The lower tubing anchor 296 is a press fit, or in the alternative, it may be TIG welded or silver soldered in place. The upper tubing anchor 294 and the lower tubing anchor 296 may be formed from metal in one or several pieces; in the alternative, the anchors 294 and 296 may be injection molded or compression molded.

Figure 15:
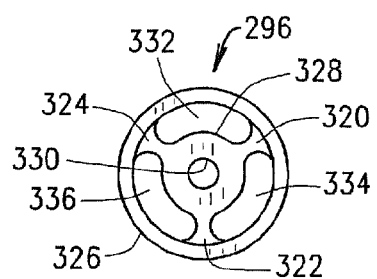
FIG. 15 is a top plan view of the lower tubing anchor along the line 15-15 of FIG. 14.
Figure 16:
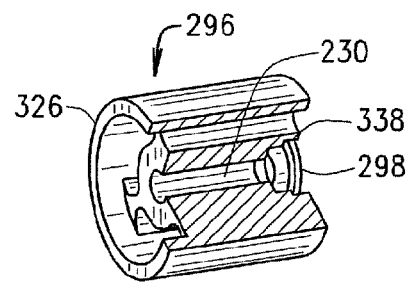
FIG. 16 is a partial cut-a-way view of the lower tubing anchor.

FIG. 15 is a top plan view of the lower tubing anchor 296 along the line 15-15 of FIG. 14. FIG. 16 is a partial cut-a-way view of the lower tubing anchor 296. A first web 320, a second web 322 and a third web 324 extend from the cylindrical body 326 to a central support 328. An axial hole 330 is formed in the center of the central support and is sized and arranged to receive an actuation tube joint, not shown. The central support, the body and the three webs define a first flow passage 332, a second flow passage 334 and a third flow passage 336. The unwanted liquid flows through the first, second and third flow passages 332, 334 and 336 up the annulus 63 between segmented hollow actuation tube 99 and the interior diameter 278 of the hollow segmented drainage shaft 280 and out of the pipeline. Each segment of the alternative embodiment 280 of the extendable segmented drainage shaft includes an upper and a lower anchor, through which unwanted liquids flow out of the pipeline.

FIG. 16 is a partial cut-a-way view of the lower tubing anchor 296. An O-ring channel 338 is formed in the end of the lower tubing anchor 296 and is sized and arranged to receive the O-ring 298 to seal against the next joint of actuation tubing, not shown.

FIG. 17 is a perspective view of an alternative embodiment 350 of the termination assembly. FIG. 18 is a section view of the alternative embodiment 350 of the termination assembly of FIG. 17. FIG. 19 is an end view of the alternative embodiment 350 of the termination assembly along the line 19-19 of FIG. 17. The alternative embodiment 350 of the termination assembly 188 is formed from three body elements. An upper body element 352, a middle body element 354 and a lower body element 360. The lower body element 360 threadably engages the middle body element 354 at threads 362. The upper body element 352 threadably engages the first segment of the extendable segmented drainage shaft, not shown in these three drawings, at threads 364. A plurality of liquid passageways 366 are formed in the lower body element 360. At least a portion of the unwanted liquids 50 flow through this plurality of liquid passageways 366.

Figure 20:
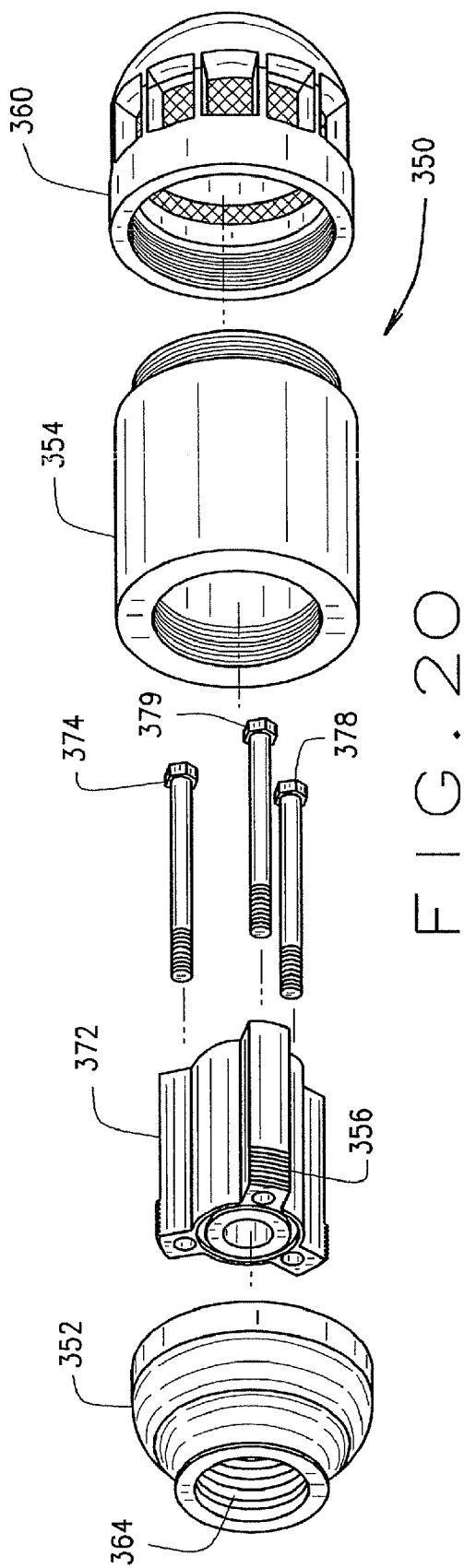
FIG. 20 is an exploded view of the alternative embodiment of the termination assembly of FIG. 19 viewed from the upper body element looking towards the lower body element.
Figure 21:
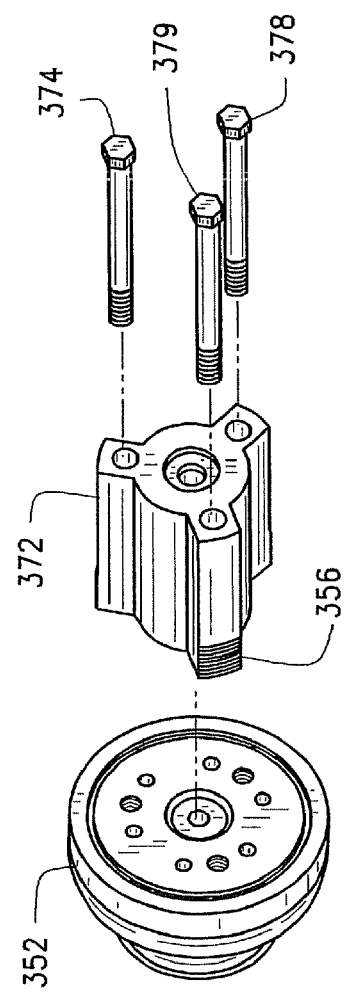
FIG. 21 is an exploded view of a portion of the alternative embodiment of the termination assembly of FIG. 19 viewed from the lower body element looking towards the upper body element.

Referring now to FIGS. 18, 20 and 21. The alternative embodiment 350 of the termination assembly is shown in greater detail. The drainage valve actuation assembly 370 moves the drainage valve assembly 373 from a normally closed position to an open position. The drainage valve assembly 373 includes: a drainage valve element 368 that supports an O-ring 384 which selectively engages a valve seat 369 formed in the middle body element 354.

The drainage valve actuation assembly 370 includes: a drainage valve core 372 connected to the upper body element 352 by a plurality of bolts that fit through the drainage valve core 372, better seen in FIGS. 20 and 21. Bolts 374, 378 and 379 fit through passages, not shown and threadably engage the upper body 352. Threads 356, better seen in FIGS. 20 and 21 on the exterior of the drainage valve core 372 threadably engage the upper body element 352. The drainage valve core 372 is hollow and forms a cylinder 382.

A piston 386 is sized and arranged to slide inside the cylinder 382 in response to pressure from hydraulic actuation fluid. The piston 386 is threadably attached by screw 392 to one end of the piston rod 388. The drainage valve element 368 is attached to the other end of the piston rod 388. A spring 390 surrounds the piston rod 388 and is captured between the piston 386 and the drainage valve core 372 holding the drainage valve element 368 in the normally closed position as shown in FIG. 18. Hydraulic actuation fluid is injected from a source of pressurized hydraulic fluid 444, outside the pipeline, through the hollow actuation tube as indicated by the flow arrow A, to the chamber 385 in order to move the piston 386, the piston rod 388 and the drainage valve element 368 from the normally closed position to the open position, not shown. The force of the pressurized hydraulic fluid overcomes the force of spring 390

Annular liquid passageways 394 are formed between the outside of the drainage valve core 372 and the inside of the middle body element 354. When the drainage valve element 368 is in the open position, unwanted liquids flow through the annular liquid passageways 394, through passageways 396, through the extendable segmented drainage shaft 60, 280 to a location outside the pipeline as better shown in FIG. 22.

FIG. 19 shows another liquid passageway 398 which is filtered by a first screen 400. The plurality of liquid passageways 366 in FIG. 17 are filtered by a second screen 402.

FIG. 22 is a partial section view of the surface mounted termination assembly generally identified by the numeral 420. FIG. 22A is an enlargement of a portion of the surface mounted termination assembly 420 of FIG. 22. The lubricator 56 includes a first flange 422 and a second flange 424. The first flange is typically bolted to an isolation valve 57, which typically engages a welded fitting 58, better seen in FIG. 1, but not shown in this figure. The extendable segmented drainage shaft 60, 280 has a termination assembly 188 or 350 on the subsurface end and the surface mounted termination assembly 420 on the other end. Because the termination assembly is deeply inserted into the pipeline, it may be sometimes referred to as the subsurface termination assembly. The unwanted liquids travel from a low point in a pipeline through the termination assembly 188 or 350, through the annulus 63 between drainage shaft 60, 280 and the actuation tubing shaft 99 and through the surface mounted discharge assembly 420 as indicated by the flow arrows U.

A first valve 430 threadably engages the fitting 428 and regulates the flow of unwanted fluids from the pipeline as indicated by the flow arrow U. A second valve 432 engages the fitting 428 and regulates the flow of actuation fluid from the second source of pressurized fluid 444 into the actuation tubing as indicated by the flow arrows A.

The last segment 426 of the drainage shaft 60 is locked to the lubricator 56 by the locking assembly 250. The last segment 426 of the drainage shaft also engages the fitting 428.

The stub end 434 of the hollow actuation tube 99 stabs past an O-ring 436 into the fitting 428. The O-ring 436 seals the stub end 434 against the fitting 428 so hydraulic actuation fluid flows through the fitting 428, the hollow actuation tube 99 as indicated by the flow arrows A in FIG. 22A. Unwanted liquids flow up the hollow axial center 100 of extendable segmented drainage shaft 60 through the fitting 428 as indicated by the flow arrows U in FIG. 22A.

Method of Installation

The fitting 58 is welded to the pipeline, either during construction or afterwards. The angle of the fitting must be properly oriented so the extendable segmented drainage shaft 60, 280 is directed towards the unwanted fluids 50. The isolation valve 57 is placed in the closed position and connected to the fitting 58.

The first segment 74 of the extendable segmented drainage shaft 60 is inserted into the sealed lubricator 56 and the valve 438 is closed. The locking assembly 250 attaches the first segment 74 to the lubricator 56. The lubricator 56, the first segment 74 and the locking assembly 250 are connected to the isolation valve which is in the closed position.

The removable automatic insertion device 54 is connected to the lubricator. In a typical river or road crossing, the welded fitting 58, the isolation valve 57, the sealed lubricator 56 and the removable automatic insertion device 54 may be oriented at an acute angle relative to the pipeline. Acute is anything between, but not including 0 to 90 degrees. Other angles may be used for tanks and other pressurized vessels.

As best seen in FIG. 5, the second segment 92 of the extendable segmented drainage shaft 60 is inserted into the stand off assembly 76 and threaded to the first segment 74 of the extendable segmented drainage shaft 60. Pressure is applied to the double acting piston/cylinder 66 from the first source of pressurized fluid 84. The piston 70 drives the insertion rod 68 into contact with the second segment 92 of the extendable segmented drainage shaft 60 to achieve a state of equilibrium with pipeline pressure. The locking assembly 250 is then removed and the isolation valve 57 is opened as best seen in FIG. 6.

When the isolation valve 57 is opened, termination assembly 188 or 350 is exposed to full pipeline pressure which may exceed 1000 psi. The pipeline gas does not leak through the termination assembly or the drainage shaft 60 because the drainage valve assembly 190, 373 is in a normally closed position due to spring pressure and should only open in response to pressurized actuation fluid from the second source of pressurized fluid 444, best seen in FIG. 22.

The extendable segmented drainage shaft 60, 280 is inserted into the pipeline on a segment by segment basis. The locking assembly 250 is removed from the second segment 92 and the piston/cylinder is stroked to drive the insertion rod 68 into the extended position which inserts the second segment 92 past the isolation valve 57 and the fitting into the pipeline. The locking assembly 250 is then connected to the second segment 92, to hold it in place against pipeline pressure and the insertion rod 68 is stroked into the withdrawn position. A third drainage shaft segment, not shown is then inserted into the stand off assembly 76 and the process is repeated until the last drainage shaft segment 426 is inserted and locked to the lubricator 56, as shown in FIG. 22

The removable automatic insertion device is referred to as "automatic" because the piston/cylinder has sufficient force to overcome the pipeline pressure which resists insertion of the drainage shaft segments into the pipeline. Some prior art devices used manual force to overcome the pipeline pressure. Because the present invention uses pressure from the piston/cylinder, it is referred to as "automatic" as opposed to some prior art manual devices.

After the insertion process is complete, the removable automatic insertion device 54 is removed from the lubricator 56. The surface mounted discharge assembly 420, best seen in FIG. 22 is then connected to the last drainage shaft segment 426 of the extendable segmented drainage shaft 60 and the stub end joint 434 of the hollow actuation tube 99. As previously noted, the extendable segmented drainage shaft 60 has some degree of flexibility. FIG. 2 is merely an illustration of how the invention looks. In actuality, a portion of the extendable segmented drainage tube will be in contact with the conduit 62.

Drainage Operations

A second source of pressurized actuation fluid 444, as better seen in FIGS. 22 and 22A is in fluid communication with a valve 432 which when opened allows the pressurized actuation fluid to flow through the valve 432, the fitting 428 and into the segmented hollow actuation tube 99 as indicated by the flow arrows A. The pressurized actuation fluid then flows down the segmented hollow actuation tube 99, inside the extendable segmented drainage shaft 60, 280 into the subsurface termination assembly 188 or 350 to move the drainage valve assembly 190 or 373 from the normally closed to the open position.

Once the drainage valve element 191 or 368 is moved out of engagement with the valve seat 206, the unwanted liquids enter the termination assembly 188 or 350 as indicated by the flow arrows U and travel up the extendable segmented drainage shaft 60, 280 into the fitting 428, through the open valve 430 and thus out of the pipeline due to pipeline pressure which is greater than atmospheric pressure. After the drainage operation has been completed, the valve 430 is closed. The pressurized actuation fluid in the segmented hollow actuation tube 99 is depressurized and the drainage valve assembly 190 or 373 will automatically close due to the forces exerted by the spring 186 or 390. The second valve 432 is then closed.

The surface mounted discharge assembly 420 of FIG. 22 may be left on the pipeline so unwanted liquids may be periodically drained from the pipeline in the future. This is the least labor intensive approach, but it requires a capital investment to insert and leave the extendable segmented drainage shaft 60 in place.

In the alternative, the extendable segmented drainage shaft 60, 280 may be withdrawn, one segment at a time, from the pipeline. After all the intermediate drainage shafts have been withdrawn and disassembled, all that will be left is the first segment 74 and the termination assembly 188 or 350. The termination assembly 188 or 350 is then withdraw from the pipeline, the fitting and the isolation valve 57 into the lubricator 56. This withdrawn position will allow pigs to pass through the pipeline in an unimpeded fashion should they be required for maintenance or operational functions.

In yet another alternative, the isolation valve 57 may be closed, the lubricator 56 may be vented to atmosphere by opening valve 438 and the lubricator 56 may be unbolted from the isolation valve 57 and removed from the first location to be used elsewhere.

The invention claimed is:

1. A removable automatic insertion apparatus with an extendable segmented drainage shaft for draining unwanted liquids from a pressurized pipeline comprising:

the extendable segmented drainage shaft being formed from a plurality of independent hollow drainage shaft segments which engage each other, the extendable drainage shaft further including a segmented hollow actuation tube being formed from a plurality of independent hollow actuation tubing segments, each being slightly longer than the length of each drainage tube segment, each actuation tube segment being connected to the other, the drainage shaft and the actuation tube being extended on a segment by segment basis into the pipeline and being withdrawn on a segment by segment basis;

a connector positioned proximate the pipeline through which the extendable drainage shaft is inserted into the pipeline, the connector sealing against the escape of pipeline pressure and further including a locking assembly to selectively secure the extended drainage shaft inside the pipeline to the connector, after each drainage shaft segment has been inserted into the pipeline to prevent unwanted expulsion of the extended drainage shaft from the pipeline due to pipeline pressure;

the removable automatic insertion apparatus for the extendable drainage shaft having:
- a double acting piston/cylinder with an insertion rod extending from the piston and outside of the double acting cylinder, the tip of the insertion rod engaging each drainage shaft segment as it is inserted into the pipeline;
- an extension assembly separating the double acting piston/cylinder from the connector at least the distance of a drainage shaft segment; and
- a termination assembly attached to the tip of the extendable drainage shaft, the termination assembly having a drainage valve element and a drainage valve actuation assembly; and the segmented hollow actuation tube in fluid communication with a source of pressurized fluid and connected on the other end to the termination assembly, the source of pressurized fluid forcing fluid through the segmented hollow actuation tube into the drainage valve actuation assembly to move the drainage valve element from the normally closed position to the open position allowing liquids to be forced past the drainage valve element through the hollow extendable drainage shaft and out of the pipeline due to pipeline pressure.

2. A removable automatic insertion apparatus with an extendable segmented drainage shaft for draining liquids from a pressurized pipeline comprising:
the extendable segmented drainage shaft having an internal segmented, hollow, actuation tube;
means for inserting the segmented extendable drainage shaft into and out of the pipeline through a connector, the segmented extendable drainage shaft extending more than one diameter beyond a fitting;
means for selectively locking each segment of the segmented extendable drainage shaft as it is inserted into and withdrawn from the pipeline to prevent unwanted expulsion of the segmented extendable drainage shaft from the pipeline due to pipeline pressure;
means for selectively opening and closing the segmented extendable drainage shaft to allow unwanted liquids to be forced through the segmented extendable drainage shaft due to pipeline pressure.

3. A surface mounted discharge assembly to direct pressurized actuation fluid through a segmented hollow actuation tube to a termination assembly and to drain unwanted liquids from a pipeline through the termination assembly and an extendable segmented drainage shaft, the surface mounted discharge assembly comprising:
a source of pressurized actuation fluid;
means for selectively transporting a pressurized actuation fluid from the source of pressurized actuation fluid, to the segmented hollow actuation tube, and the termination assembly to selectively open a drainage valve element;
means for transporting unwanted liquids from the extendable segmented drainage shaft to a location outside of the pipeline;
means for locking the extendable segmented drainage shaft in the pipeline so it is not ejected due to pipeline pressures.

4. An extendable segmented drainage shaft comprising:
a first elongate drainage shaft segment sized and arranged to fit through a lubricator, the first elongate segment having a male end sized and arranged to engage a termination assembly and an opposite female end sized and arranged to receive another drainage shaft segment;
a plurality of intermediate elongate drainage shaft segments sized and arranged to fit through a lubricator, each having a male end with a seal element and a female end sized and arranged to engage other elongate drainage shaft segments;
a final elongate drainage shaft segment, sized and arranged to fit through a lubricator and engage an surface mounted discharge assembly;
each elongate drainage shaft segment having a hollow axial center to surround a segmented hollow actuation tube;
a first elongate hollow actuation tube segment connected on one end to the termination assembly and on the other end to another elongate hollow actuation tube segment;
a plurality of intermediate elongate hollow actuation tube segments;
a final elongate hollow actuation tube segment connected on one end to the external termination assembly and the other end to another elongate hollow actuation tube segment.

5. The apparatus of claim 4 wherein the plurality of intermediate elongate hollow actuation tube segments are connected to each other with tubing unions.

6. The apparatus of claim 4 wherein the plurality of intermediate elongate hollow actuation segments are connected to each other by a plurality of upper and lower anchors secured in each intermediate extendable segmented drainage shaft.

7. A method for automatic insertion of an extendable segmented drainage shaft into and out of a pressurized pipeline for draining unwanted liquids from the pipeline comprising the following steps:
attaching a fitting to the pipeline;
attaching a connector to the fitting and mounting a removable automatic insertion apparatus to the connector;
inserting the hollow extendable drainage shaft, one segment at a time, through the fitting into the pipeline to form a hollow extendable segmented drainage shaft that reaches the unwanted liquids in the pipeline, the drainage shaft extending more than one pipeline diameter beyond the fitting;
locking the extendable segmented drainage shaft to the connector to prevent unwanted expulsion from the pipeline due to pipeline pressure; and
opening a valve element proximate the tip of the extendable segmented drainage shaft to allow the unwanted liquids to flow out the hollow extendable segmented drainage shaft due to pipeline pressure.

8. The method of claim 7 further including:
closing the valve element after at least a portion of the unwanted liquids have been drained from the pipeline; and
removing the automatic insertion apparatus from the connector.

9. A method for automatic insertion of a hollow segmented drainage shaft into and out of a pressurized pipeline for draining unwanted liquids from the pipeline comprising the following steps:
attaching a fitting to the pipeline;
attaching a connector to the fitting;
inserting, one segment at a time, the drainage shaft through the connector into the pipeline to form a hollow extendable segmented drainage shaft that reaches the unwanted liquids, the drainage shaft extending more than one pipeline diameter beyond the fitting;

locking the extendable segmented drainage shaft to the connector; and opening a valve element proximate the tip of the extendable segmented drainage shaft to allow the unwanted liquids to flow out the hollow extendable segmented drainage shaft due to pipeline pressure.

10. The method of claim 9 further including removal of the automatic insertion device from the connector.

11. A method for draining unwanted liquids from a pipeline comprising the following steps:

selectively transporting a pressurized actuation fluid from a source of pressurized actuation fluid through a segmented hollow actuation tube to a termination assembly to selectively open a drainage valve;

transporting unwanted liquids from inside the pipeline through the extendable segmented drainage shaft to an surface mounted discharge assembly; and selectively depressurizing the actuation fluid in the segmented hollow actuation tube so the drainage valve will close due to spring pressure.

\* \* \* \* \*